Inventor,
Donald F. Wilcock,
by J.F. McDuritt
His Attorney.

Aug. 29, 1967  D. F. WILCOCK  3,338,643
HYDROSTATIC BEARING
Filed April 22, 1965  2 Sheets-Sheet 2
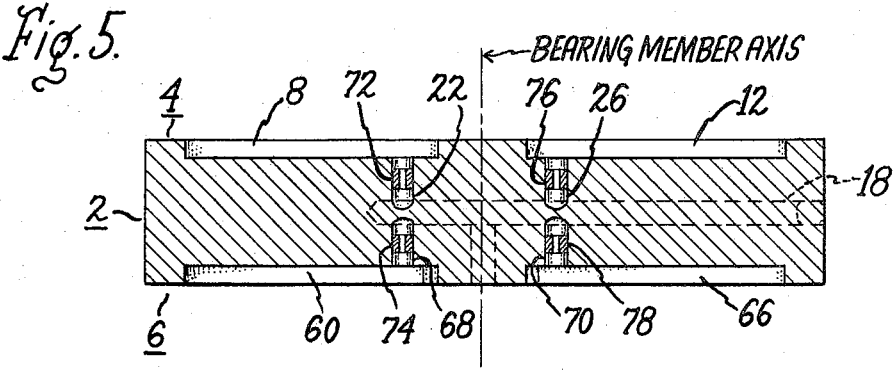
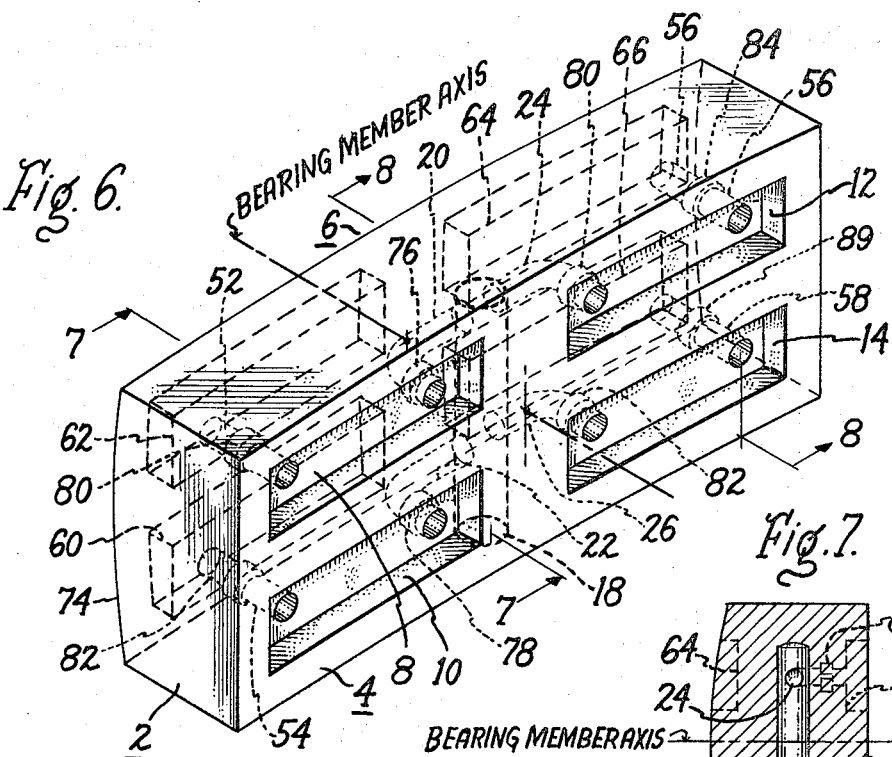
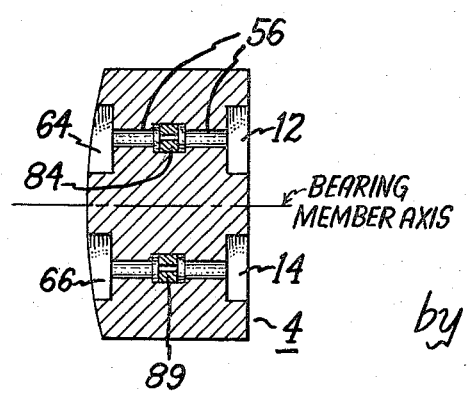
Inventor,
Donald F. Wilcock,
by J. F. McDevitt
His Attorney.

United States Patent Office
3,338,643
Patented Aug. 29, 1967

3,338,643
HYDROSTATIC BEARING
Donald Frederick Wilcock, Pittsfield, Mass., assignor to General Electric Company, a corporation of New York
Filed Apr. 22, 1965, Ser. No. 450,082
6 Claims. (Cl. 308—9)

ABSTRACT OF THE DISCLOSURE

A bearing segment which uses a plurality of pockets in each of two opposed bearing surfaces to provide self-alignment of the segment to load deflection. One bearing surface has an arcuate shape and the segment rests in a support of like contour. Fluid is fed to the pockets and forms a film at each bearing surface and fluid forces generated in these films accomplish the self-alignment.

This invention relates generally to a hydrostatic bearing having self-aligning means to correct for deflection of the bearing during operation. More particularly, the present invention deals with adjustment means in the bearing member to insure a continued supply of lubricant to contacting surfaces under deflection loads about the bearing axis. Specifically, the present invention provides self-compensation in the bearing to resist deflection at the bearing surfaces from overturning moments.

In hydrostatic bearing operation, large deflections at the bearing surfaces are often encountered under transient operating conditions. For example, windloads can generate large overturning moments in the bearing supports of uncovered radar antennas. The randomness of wind makes is particularly difficult to compensate for the deflection force by any established technique. Substantially deflection arises especially in large bearing members if the center of gravity for the bearing load is not coincident with the bearing axis. Misalignment produced in such manner occurs in both radial- and thrust-type bearings.

A known thrust-bearing arrangement for large radar antenna pedestals employs a multiplicity of individual bearing shoes or segments symmetrically disposed about the central vertical axis of the pedestal. Said bearing shoes or pads are fixed in a nonrotating support of the pedestal for contact of the load-bearing surfaces with a complementary-shaped face of a rotating pedestal member. Thrust is thereby imparted from the rotating member to each shoe in a vertical direction parallel to the central vertical axis. Windloads apply a deflection moment about said vertical bearing axes thereby occasioning individual misalignment. Other stationary bearing shoes are positioned radially about the central pedestal axis to provide lateral bearing surfaces for the rotating member. Under normal conditions, radial loads are again applied along the bearing axes of said bearings. Upon substantial deflection of said rotating member, however, there is undesirable misalignment of the radial bearing shoes as well.

Accordingly, it is an object of my invention to provide a self-aligning bearing member under deflection loads.

A still further important object of my invention is to provide a self-aligning bearing which is useful in both thrust- and radial-bearing applications.

Still a further object of my invention is to utilize a liquid-bearing film in a hydrostatic bearing for the self-alignment.

A still further object of the invention is to provide a free-floating bearing member which can align itself responsive to deflection moments and thereby prevent or minimize metal contact between bearing surfaces.

Figure 1:
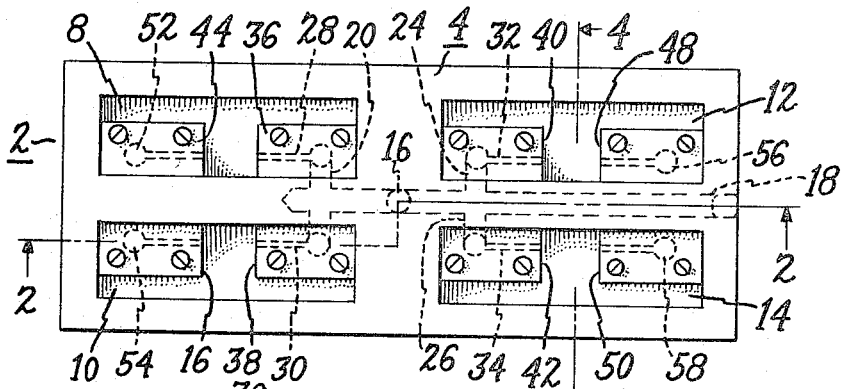
Figure 2:
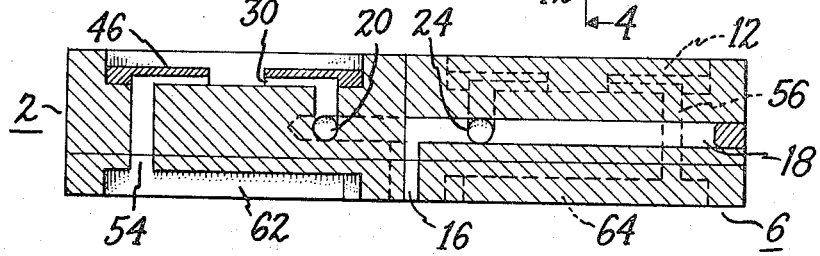
Figure 3:
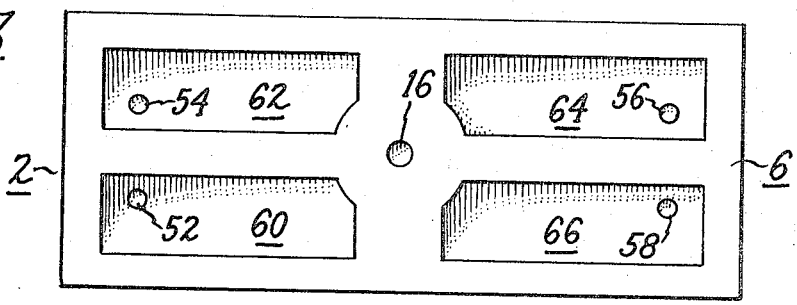
Figure 4:
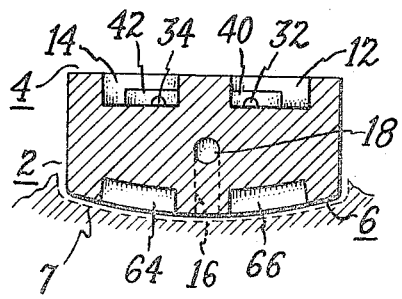

These and other important objects of the invention will become more apparent by reference to the following description taken in connection with the accompanying drawings in which:

FIGURE 1 is a plan view of a preferred bearing member of the invention;
FIGURE 2 is a schematic view partially in cross section taken along line 2—2 in FIGURE 1;
FIGURE 3 is a bottom view of the FIGURE 1 embodiment;
FIGURE 4 is a cross-sectional view taken along line 4—4 in FIGURE 1;
FIGURE 5 is an elevational view partially in cross section illustrating a different bearing embodiment of the invention;
FIGURE 6 is a schematic projection view illustrating a radial-bearing member embodiment of the invention;
FIGURE 7 is a cross-sectional view taken along line 7—7 in FIGURE 6; and
FIGURE 8 is a different cross-sectional view taken along line 8—8 in FIGURE 6.

Briefly, the present bearing construction comprises a hydrostatic bearing shoe or segment having a first bearing surface disposed opposite a second bearing surface, said first bearing surface having a set of pockets disposed about the bearing axis, said second bearing surface having a set of pockets and being of arcuate shape for coaction with a mating bearing seat, and fluid communication means in the shoe to both sets of pockets whereby fluid from the bearing surfaces aligns the bearing shoe in the bearing seat responsive to deflection forces exerted upon the shoe. The alignment is produced by an equilibrium adjustment in the fluid film at the first bearing surface which is in contact with the external load member during operation. The fluid film at the second bearing surface allows the shoe to pivot freely about said bearing axis for return of alignment between the tilted load member and the shoe.

Referring to the figures in the drawings, wherein like members refer to like or similar members, the desired coaction is obtained with fluid forces exhibited in the clearance gap between the first bearing surface and the external load member. An equilibrium adjustment takes place when the fluid film thickness in this gap becomes unequal due to misalignment of the load member. Reduction of the film thickness on one side of the bearing axis produces greater fluid flow resistance in the nearest pocket. With localized increase of the pocket pressure there is generated a restoring fluid moment to align the bearing shoe with the load member. The pockets at said bearing surface are advantageously all supplied from a single conduit means in the shoe to maintain a fixed supply pressure for the desired coaction to take place. Pockets in the second bearing surface contribute to the load-bearing capacity of the shoe. As will be described hereinafter in greater detail, fluid communication between pockets in opposing bearing surfaces furnishes other operational advantages in bearing performance. Regulation of fluid flow to the pockets on one or both bearing surfaces yields still further performance advantages. With such variation being possible, it is not intended to limit the present invention to the preferred embodiments hereinafter described.

In FIGURES 1–4 there is shown a thrust-bearing shoe incorporating the self-aligning features. Generally, the bearing shoe 2 has a flat bearing surface 4 for contact with a rotating member of matching surface (not shown) disposed opposite an arcuate bearing surface 6 which is in contact with a bearing seat of complementary shape. Partial outline of said bearing seat 7 is conveniently depicted in FIGURE 4 for clarity of illustration. The pocket elements in each bearing surface are all aligned about the bearing axis. A centrally disposed conduit means in the shoe supplies fluid to each pocket in the bearing surface which contacts the external rotating load member. Referring to FIGURE 1, pocket elements 8, 10, 12, and 14 are each of substantial identical area to generate a uniform fluid force across the bearing surface 4 when supplied from a common source of high pressure fluid. The fluid is admitted into the bearing member through opening 16 for passage to distribution duct 18. The passage of fluid from the distribution duct to each pocket in bearing surface 4 is through connecting ducts 20, 22, 24, and 26. Said ducts terminate at the base of each pocket in inlet openings to restrictor grooves 28, 30, 32, and 34. Cover plates 36, 38, 40, and 42, respectively, define a restricted passageway to each of said pockets. The cover plate is secured to the base of its pocket by conventional fastening means. Fluid flow from said pockets to pockets in the opposing bearing surface is restricted by like means. More particularly, each of said pockets contains additional cover plates 44, 46, 48, and 50, respectively, whereby flow of the fluid is restricted in its passage to similarly disposed pockets on arcuate bearing surface 6. An exit opening in each pocket aligned with the flow restrictions defined by said cover plates connects with vertical ducts 52, 54, 56, and 58, which are in direct communication with the lower set of pockets. Reference to FIGURE 2 more clearly shows the direct fluid communication between opposing bearing pockets obtained with vertical ducts 54 and 58. FIGURE 3 depicts the termination for each of the vertical ducts in pocket elements 60, 62, 64, and 66, respectively. Said latter set of pockets has a larger effective area than provided with the pockets in bearing surface 4 to maintain a fluid film at the reduced fluid supply pressure.

In operation, said bearing shoe pivots about the bearing axis on bearing surface 6 responsive to tilt of the deflective rotating member. Uniaxial alignment takes place with the circular arc contour provided although it is well within contemplation to employ a ball-shaped bearing surface for biaxial alignment. Biaxial alignment is facilitated with four pockets on the flat bearing surface symmetrically disposed about the bearing axis. A complementary shaped bearing seat for the alignment surface contains an oil-admission port to provide the shoe with a supply of pressurized fluid. Fluid at the supply pressure is fed through flow restrictors into the set of pockets on the flat bearing surface to insure a metered supply of fluid to each pocket. Flow restriction in the fluid supply to pockets of the opposing bearing surface lowers the pressure for minimum fluid losses. The above bearing shoe exhibited excellent stiffness behavior during performance evaluation.

FIGURE 5 is an elevational view of a different bearing shoe wherein self-alignment is achieved with separate ducts directly connecting pockets in the opposing bearing surfaces. More particularly, pockets 8 and 12 in bearing surface 4 of bearing shoe 2 are fed from duct elements 22 and 26, respectively, which both lead from a single distribution conduit 18. Pockets 60 and 66 in the arcuate bearing surface 6 are connected directly from the same conduit by duct elements 68 and 70, respectively. In like manner, all remaining pockets on each bearing surface are supplied directly from the same conduit. Flow control elements 72, 74, 76, and 78 in the connecting ducts regulate the fluid films at each bearing surface in accordance with the foregoing principles.

In FIGURE 6, there is shown a bearing shoe having a pair of opposing arcuate bearing surfaces for self-alignment under radially applied loads. More particularly, bearing shoe 2 includes a pair of opposing bearing surfaces 4 and 6 which cooperate to provide alignment in bearing seat 74 when deflection loads are applied about the bearing axis. The small clearance space between said bearing shoe and the complementary shaped bearing seat is sufficient for the self-alignment in accordance with the above-described principles. Pocket elements 8, 10, 12, and 14 are all disposed about said bearing axis to provide the restoring force couple needed for alignment. Duct elements 20, 22, 24, and 26 supply fluid to said pockets, respectively, from a central distribution passageway 18. An external supply source (not shown) is connected to the central passageway to furnish a pressurized fluid which may be gas or liquid. Flow restrictor elements 76, 78, 80, and 82 are inserted directly in the duct passages upstream from the pockets to prevent unequal flow distribution. Equivalent flow metering is obtained with various type restrictor elements, including an orifice, a capillary tube or a flow control valve in the duct passages. Fluid communication between similarly oriented pockets on the opposing bearing surfaces is advantageously provided through interconnecting ducts. Thus, pocket elements 60, 62, 64, and 66 on bearing surface 6 are each individually connected with a pocket on bearing surface 4 where the alignment forces take place. The interconnecting ducts 52, 54, 56, and 58 each contain flow control elements 80, 82, 84, and 86, respectively, to lower the fluid supply pressure to the opposing bearing surface.

The series flow path of the fluid circuit for the bearing shoe constructions depicted in FIGURES 1 and 6 provides certain performance advantages. The supply pressure of fluid to the alignment bearing surface 6 is thereby varied with load forces on opposing bearing surface 4. An increase of load pressure at the latter bearing surface raises the supply pressure to the pockets in bearing surface 6 to keep its fluid film thickness constant or nearly so. Like compensation is achieved with decreasing load forces on the bearing shoe. Keeping the alignment surface film thickness substantially independent of load variation is desirable to avoid any reduction of stiffness over that obtained with conventional hydrostatic bearing constructions. A constant film thickness at said alignment surface is further desirable because it permits closer regulation of the fluid losses thereat.

From the foregoing description, it will be apparent that a generally improved hydrostatic bearing construction has been provided. It is not intended to limit the present invention or the preferred embodiments above shown, however, since certain modifications of the present teachings can be made without departing from the true spirit and scope of the invention. For example, it is not essential for the pockets in the alignment bearing surface to be oriented exactly as are the pockets on the load-bearing surface. So long as fluid forces generated at the pockets in said former surface lie in vector directions, each passing through the bearing axis, there can be no adverse operational effect. Understandably, this can be achieved with pocket orientations in the alignment bearing surface other than selected for the above specific embodiments. Likewise, there is no requirement for one or both bearing surfaces to lie in planes normal to the bearing axis for corrective alignment of the shoe. Either bearing surface can be displaced significantly from said disposition and the self-alignment still takes place. The symmetrical disposition of bearing surfaces and pockets about said axis in the above embodiments illustrates a preferred arrangement only. It will be advantageous in the bearing constructions of the invention if there is provision for continuous fluid supply to central passageway in the shoe with movement of the member. This can be obtained by enlarging the inlet opening either in the shoe or the exit opening in the mating seat. To further insure passage of fluid to the shoe it will be advantageous if a resistance to flow is inserted at said connection. An O-ring seal at the location provides an effective resistance element for the indicated purpose. It is intended to limit the present invention, therefore, only to the scope of the following claims.

What I claim as new and desire to secure by Letters Patent in the United States is:

1. A self-aligning hydrostatic bearing shoe having a first bearing surface disposed opposite a second bearing surface, said first bearing surface having a set of pockets disposed about the bearing shoe axis, said second bearing surface having a set of pockets and being of arcuate contour for coaction with a mating bearing seat, and fluid communication in the shoe to the pockets of said first bearing surface, said first set of pockets also having ducts connecting with the pockets of the second bearing surface, whereby fluid from the bearing surfaces aligns the bearing shoe in the bearing seat responsive to deflection forces exerted upon the shoe.

2. A self-aligning hydrostatic bearing shoe having a pair of opposing bearing surfaces aligned symmetrically about the shoe axis, one of said bearing surfaces being of arcuate contour for coaction with the mating bearing seat, both of said bearing surfaces lying in planes normal to said axis, each of said bearing surfaces having a plurality of pockets disposed about said axis for containing a high pressure fluid, communication means in the shoe for supplying high pressure fluid to the pockets on one bearing surface, said pockets in said one bearing surface also having ducts connecting with the pockets of the second bearing surface whereby pressurized fluid in the pockets of said bearing surfaces aligns the bearing shoe in the bearing seat.

3. A self-aligning hydrostatic bearing shoe having opposing bearing surfaces disposed symmetrically about the shoe axis, each of said bearing surfaces having a plurality of pockets disposed about said axis for containing a high pressure fluid, one of said surfaces being of arcuate contour for coaction with a mating bearing seat, said pockets in one bearing surface having ducts connecting with the pockets of the second bearing surface, and a plurality of ducts supplying high pressure fluid from an external source directly to each pocket in the bearing surface opposing the arcuate bearing surface whereby the pressurized fluid in the pockets of said bearing surfaces aligns the bearing shoe in the bearing seat.

4. A self-aligning hydrostatic bearing shoe having a pair of opposing bearing surfaces disposed symmetrically about the shoe axis, both of said surfaces being of arcuate contour with one of said surfaces coacting with a complementary shape bearing seat, each of said bearing surfaces having a set of pockets disposed about said axis for containing a high pressure fluid, a plurality of ducts respectively connecting each of the pockets of one set of pockets with one of the pockets of the second set, and a plurality of ducts supplying high pressure fluid from an external source directly to each pocket in the bearing surface opposing the coacting bearing surface whereby pressurized fluid in the pockets of said beairng surfaces aligns the bearing shoe in the bearing seat.

5. A self-aligning hydrostatic bearing shoe which comprises a free-floating bearing member having a pair of opposing bearing surfaces disposed symmetrically about the shoe axis, both of said surfaces being of arcuate contour with one of said surfaces coacting with a complementary shape bearing seat, each of said bearing surfaces having a set of pockets disposed about said axis for containing a high pressure fluid, a plurality of ducts respectively connecting each of the pockets of one set of pockets with one of the pockets of the second set, flow control means cooperating with each of said ducts to regulate flow into said pockets, and a plurality of ducts supplying high pressure fluid from an external source directly to each pocket in the bearing surface opposing the coacting bearing surface whereby pressurized fluid in the pockets of said bearing surfaces aligns the bearing member in the bearing seat.

6. A self-aligning hydrostic bearing shoe having a pair of opposing bearing surfaces disposed symmetrically about the bearing shoe axis, at least one of said surfaces being of arcuate contour for coaction with a complementary shape bearing seat, said bearing surface opposing the coacting bearing surface having a first set of uniform size pockets disposed about said axis for containing a high pressure fluid, said coacting bearing surface having a second set of uniform larger size pockets aligned symmetrically about said axis, a plurality of ducts containing flow control means which supply high pressure fluid from an external source directly to each of said first set of pockets, and a plurality of ducts containing flow control means respectively connecting each of the pockets in the first set with one of the pockets in the second set whereby pressurized fluid in the pockets of said bearing surfaces aligns the bearing member bearing seat.

References Cited

UNITED STATES PATENTS 2,155,455    4/1939    Thoma _____ 308—9
2,597,371    5/1952    Perkins et al.

MARTIN P. SCHWADRON, *Primary Examiner.*

FRANK SUSKO, *Examiner.*